UNITED STATES PATENT OFFICE.

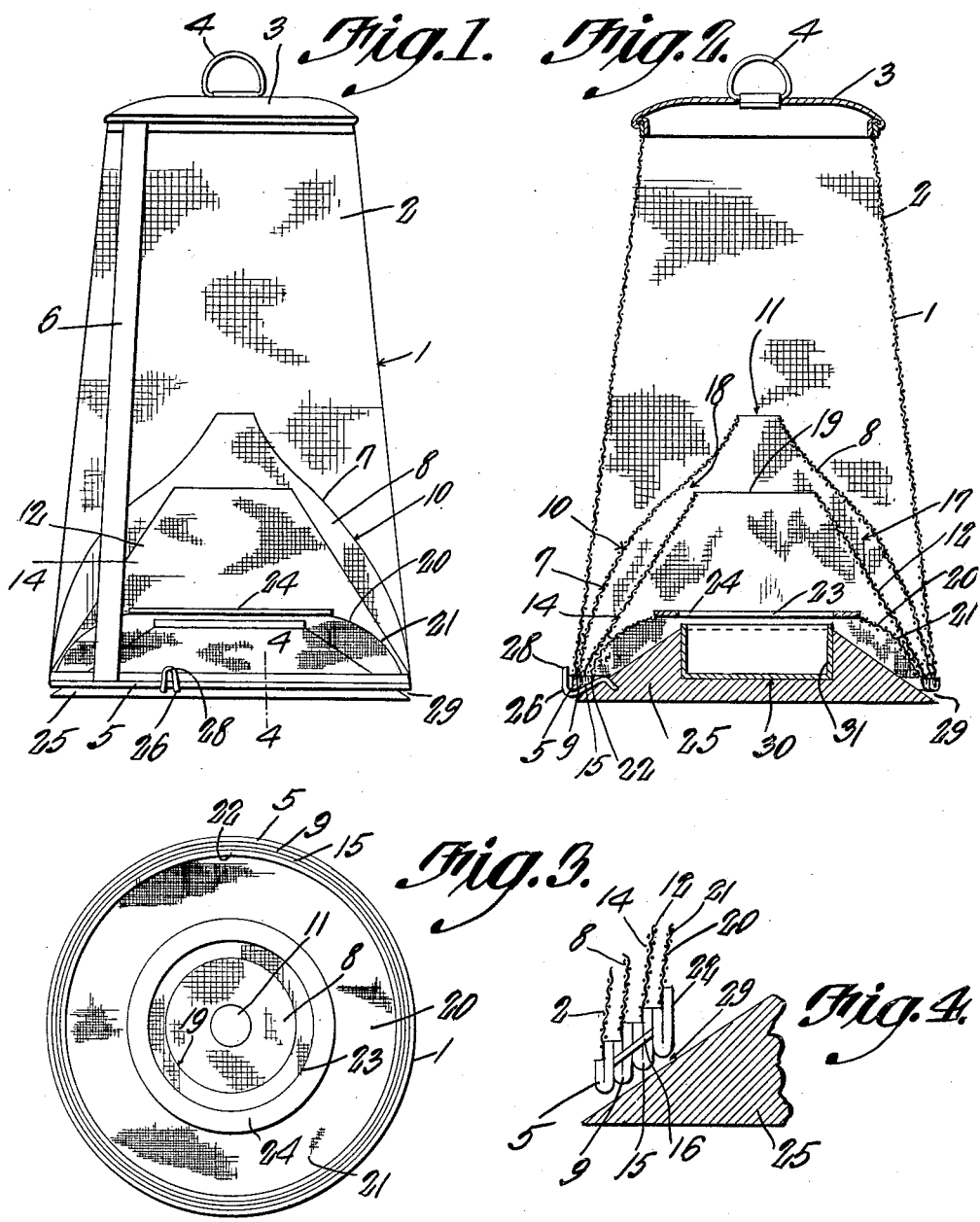

JAMES GUY, OF PAOLA, KANSAS.

FLY-TRAP.

1,065,241.  Specification of Letters Patent.  Patented June 17, 1913.

Application filed October 24, 1912. Serial No. 727,635.

*To all whom it may concern:*

Be it known that I, JAMES GUY, a citizen of the United States, residing at Paola, in the county of Miami and State of Kansas, have invented a new and useful Fly-Trap, of which the following is a specification.

The device constituting the subject matter of this application is a fly trap, and the invention aims to provide a device of the character above specified, in which ingress will be comparatively easy, egress being practically impossible.

Specifically, the invention aims to provide a trap of the character described, having a plurality of nested conical leaders, coöperating to prevent egress from the trap.

Another object of the invention is to provide novel means for connecting the body portion of the trap with the base, and to provide a base of novel form.

The invention, aims further, to increase the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing:—Figure 1 is a side elevation; Fig. 2 is a vertical longitudinal section; Fig. 3 is a bottom plan of the receptacle, showing the several leaders therein; and Fig. 4 is an enlarged sectional detail on the line 4—4 of Fig. 1.

In carrying out the invention there is provided a receptacle 1 which is preferably of frusto-conical form. The receptacle 1 comprises a foraminous side wall 2 which may be fashioned from wire netting, the upper end of the side wall 2 being connected with a cap 3 having an eye 4. The lower end of the side wall 2 of the receptacle 1 is received within a double walled ring 5. Upright braces 6 may connect the ring 5 with the cap 3.

The invention further includes an outer leader, denoted generally by the numeral 7, the leader 7 being of conical form. The leader 7 comprises a foraminous wall 8, the lower end of which is received within a double walled ring 9. The ring fits with a frictional hold within the ring 5 of the receptacle 1. The wall 8 is outwardly convexed, as shown at 10, and in the apex of the outer leader 7 there is an opening 11.

An intermediate leader 12 is provided, the same being of conical form and comprising a straight, foraminous wall 14, the lower end of which is received within a double wall ring 15. The ring 15 fits closely within the ring 9 of the outer leader 7, and the rings 15 and 9 are united by means of connecting elements 16 which may be rivets or the like.

At this point it may be noted that the wall 14 of the intermediate leader 12 is straight, the wall 8 of the outer leader 7 being convexed, as indicated at 10, away from the wall 14; thus there is formed, between the walls 8 and 14, a compartment 17 having a reduced inlet 18. There is an opening 19 in the top of the intermediate leader 12, the opening 19 being located at some distance below the opening 11 which exists at the top of the outer leader 7.

The invention further includes an inner leader 20, comprising a foraminous wall 21, inclined inwardly, at an acute angle to the wall 14 of the intermediate leader 12. The lower end of the foraminous wall 21 of the inner leader 20 is received within a double walled ring 22. The ring 22 fits with a frictional hold within the ring 15 of the intermediate leader 12. In the top of the leader 20 there is an opening 23, surrounded by reinforcing ring 24.

The invention further includes a frusto-conical base 25 which extends upwardly within the contour of the inner leader 20. The base 25 carries looped-shaped hooks 26, the ends 27 of which are inverted in the slant faces of the base 25, the bills 28 of the hooks 26 upstanding upon the outside of the receptacle 1, to prevent the receptacle and all of the leaders from moving transversely upon the base 25. The hooks 26, further serve to space all of the leaders 7, 12, and 20, together with the receptacle 1, apart from the slant face of the base 25, to define an opening 29 through which the insects may enter the trap. In the upper face of the base 25 there is formed a recess 30 in which is mounted a bait cup 31.

In practical operation, a bait of any desired sort is placed within the cup 31, and the several leaders 7, 12, and 20 are nested within the receptacle 1, as will be best understood when Fig. 4 is examined. The several leaders and the receptacle are then mounted upon the hooks 26. The insect, being attracted by the bait within the cup 31 will pass between the lower edges of the receptacle 1 and the several leaders upon the one hand, and the slant face of the base 25 upon the other hand, ingress into the trap being thus afforded. The insects, flying upwardly from the base and from the cup 31, will pass through the opening 23 in the leader 20, through the opening 19 in the leader 12 and through the opening 11 in the leader 7, the insect being thus imprisoned within the receptacle 1. Should any of the insects, having passed through the opening 19 in the leader 21, travel horizontally instead of vertically, the insects will pass through the inlet 18 and then into the compartment 17 which exists between the leaders 12 and 8. Because the compartment 17 is provided with a reduced outlet 18, the insects will not readily leave the compartment 17. Further, should any of the insects which have been trapped within the receptacle 1 pass downwardly through the opening 11 in the leader 7, the insects, following the inner face of the leader 7, will pass into the compartment 17, as above described.

By providing a plurality of compartments, due to the presence of the leaders 7, 12 and 20 in the receptacle 1, the exit of an insect from the trap will be a matter of extreme difficulty.

The constructions of the parts, and their manner of interengagement are such that the trap may readily be taken down for the purpose of cleaning the same.

Having thus described the invention, what is claimed is:—

1. An insect trap comprising a receptacle; outer and intermediate conical leaders connected at their lower ends and frictionally held removably at their lower ends in contact with the lower end of the receptacle, the intermediate leader being of less height than the outer leader; a conical inner leader of less height than the intermediate leader, the inner leader being in frictional engagement at its lower end with the lower end of the intermediate leader; a frusto-conical base extended into the inner leader; and means for supporting all of the leaders upon the base and for spacing all of the leaders at their lower ends from the base.

2. An insect trap comprising a straight walled, conical, intermediate leader; a conical, outer leader located around the intermediate leader, the leaders defining a compartment, the wall of the outer leader being curved to bring the lower ends of the leaders into contact, and to bring the upper end of the wall of the intermediate leader close to the wall of the outer leader, thereby to define a reduced outlet for the compartment; a frusto-conical base; an inner leader located within the intermediate leader, the inner leader and the frusto-conical face of the base defining a compartment, the inner leader being curved to bring the upper end of the inner leader close to the upper end of the base and thereby to define a reduced outlet for the last specified compartment; a receptacle in which all of the leaders are inclosed; and means for maintaining the lower ends of the leaders in spaced relation to the base.

In testimony that I claim the foregoing as my own, I have hereto affixed my signature in the presence of two witnesses.

JAMES GUY.

Witnesses:
G. F. WHITTAKER,
CARSON LANE.

---

Copies of this patent may be obtained for five cents each, by addressing the "Commissioner of Patents, Washington, D. C."